July 4, 1961  S. ZWEBEN  2,990,864
REFRIGERATED FOOD PROCESSING DEVICE
Filed June 29, 1959
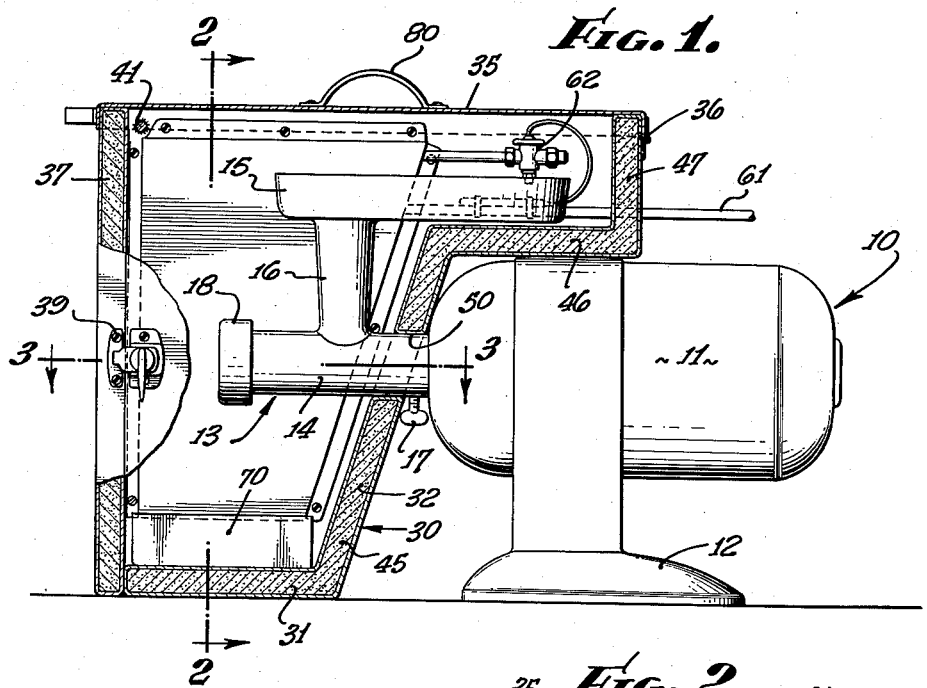
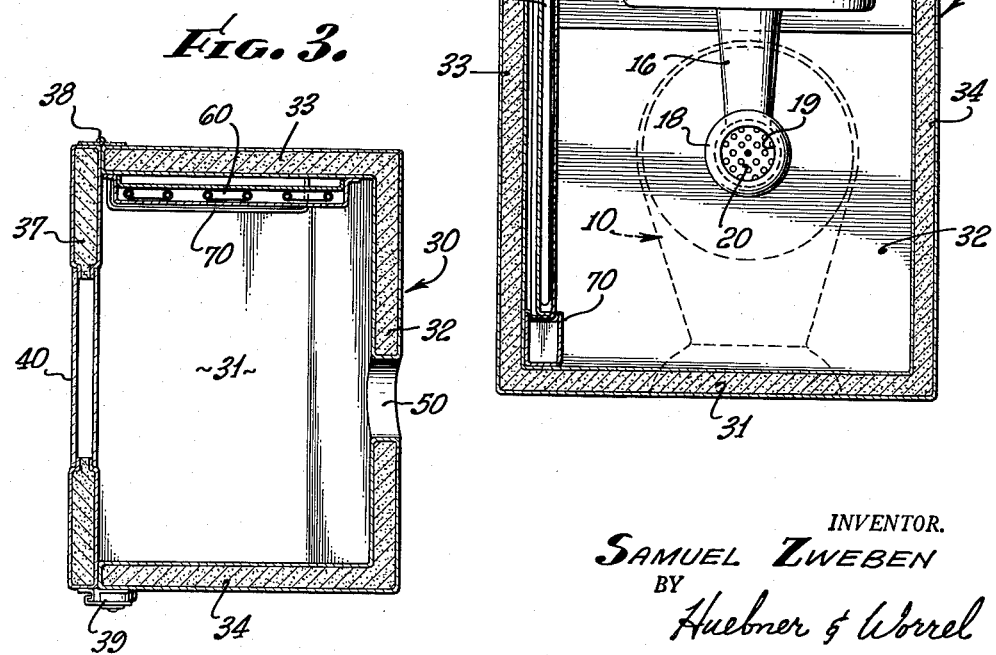
INVENTOR.
SAMUEL ZWEBEN
BY
Huebner & Worrel
ATTORNEYS.

United States Patent Office 2,990,864
Patented July 4, 1961

2,990,864
REFRIGERATED FOOD PROCESSING DEVICE
Samuel Zweben, 5407½ Wilshire Blvd.,
Los Angeles, Calif.
Filed June 29, 1959, Ser. No. 823,557
1 Claim. (Cl. 146—182)

This invention relates to a food processing device, the head of which is under refrigeration. The particular device shown in the accompanying drawing is an electric meat chopper or grinder, but it will be readily seen that the invention is equally applicable to other food processing devices, such as a hand operated meat chopper or grinder, a meat slicer, a cube steak machine, a food tenderizer machine, and other food processing machines.

Particularly discussing a meat chopper, such a device is generally placed in a prominent place in a butcher shop, in full view of customers, many of whom prefer to choose the meat which they desire to have chopped prior to processing the meat, and to have the meat chopped or ground in their presence, so that they can be assured of a freshly ground and high quality end product. However, distinct disadvantages are thus encountered, because it will be obvious that in the meat grinding process, a fairly substantial quantity of meat is not fully extruded, but is left in the grinder head after each use, and unless the grinder is promptly taken apart and cleaned after each use, which is highly impractical, or is promptly moved into the shop's refrigerated cooler room after each such use, which is also highly impractical, especially in view of the substantial weight of the usual butcher shop grinder, the quantity of meat left in the grinder, which is then exposed to room temperature, will quickly develop an unpleasant odor. Furthermore, if the machine is not regularly in use at frequent intervals, said meat will soon discolor and spoil, so that the next quantity of meat processed through the grinder will be mixed with the deleterious meat which has been exposed to room temperature in the grinder head.

It is an object of this invention to provide a refrigerated food processing device which has a refrigerator unit which may be used with a food processing machine, such as a meat chopper or grinder, to refrigerate the processing head of the machine and keep the residual food therein cool, clean and fresh.

It is a further object of the invention to provide a refrigerated food processing device which has a refrigerator unit which may be quickly and easily installed on the processing head of a standard food processing device.

It is also an object of the invention to provide a device of the character described which is attractive in appearance and efficient, but simple to operate and maintain.

It is still another object of the invention to provide a device of the character described which is relatively inexpensive to manufacture and assemble.

It is a further object of the invention to provide a device of the character described in which the refrigeration is applied solely to the direct food processing head of the device, and not necessarily to the drive means thereof.

Other and more specific objects and advantages will appear and be brought out more fully in the following specification considered with reference to the accompanying drawings throughout which like parts are designated by like numerals.

In the drawings:

FIGURE 1 is a side elevational view of the device, partly in section.

FIGURE 2 is a view taken on the line 2—2 of FIGURE 1.

FIGURE 3 is a view taken on the line 3—3 of FIGURE 1.

A food processing machine, such as a meat chopper 10, has a motor or other drive means 11 mounted on a base 12. A processing head, such as a chopper or grinder head 13, having a grinder section 14, a tray 15, and a feeder chamber 16, is removably attached to the drive means 11 by any suitable means, such as a set-screw 17. Grinder section 14 has an open-ended head 18, in which there is an opening 19 in which a grilled plate 20 is conventionally disposed.

A heat insulated housing 30 has an insulated base 31, an insulated rear wall 32, and insulated side walls 33 and 34. Mounted on said housing 30 is an insulated cover or lid 35, which may be hinged to rear wall 32 by suitable hinge means such as 36, or may be hinged to either side wall 33 or 34 by similar suitable hinge means. Housing 30 is also provided with an insulated door 37, which may be hinged to side wall 33 by suitable hinge means such as 38, and may be provided with latch means 39 to releasably secure it to side wall 34. If desired, of course, door 37 may be similarly hinged to side wall 34, in which case, latch means 39 will be mounted to secure door 37 to side wall 33. Door 37 may also be provided with a viewing window or port 40, which may be of standard single or double thermopane construction, double thermopane construction being illustrated in FIGURE 3 of the drawings.

Transverse cross-bar 41 may be mounted on side walls 33 and 34, spanning the distance therebetween.

As shown in FIGURE 1, rear wall 32 may be formed with an oblique section 45, a horizontal section 46, and a vertical section 47, if desired, to dispose said rear wall between the drive means 11 and the processing head 13, while at the same time allowing suitable clearance for tray 15. It will, of course, be understood that in food processing machines of different configuration, rear wall 32 will be constructed to be adapted thereto. For instance, if a substantial vertical tray, such as tray 15, is not provided as a part of the device, rear wall 32 may be constructed as one vertical wall, parallel or substantially parallel to door 37.

Rear wall 32 has an opening or port 50 in which processing head 13 is snugly disposed, with grinder section 14 protruding therefrom into housing 30, and with attachment means 17 preferably located on the opposite, outside projection of said processing head 13.

Disposed in said housing 30, and preferably mounted along one side wall thereof, such as side wall 33, are standard refrigerator coils 60. They are connected by means of a pipe or conduit 61 to a standard cold generating refrigerator unit, not shown. Thermostat shut-off valve 62 may be provided to thermostatically control the temperature within housing 30. A drip pan 70 is removably seated in housing 30 on base 31, in close proximity to coils 60. It will be understood that a run-off pipe or tube, not shown, may be mounted in drip pan 70, or otherwise mounted in housing 30, to carry excess moisture to a disposal drain. Coils 60 may be shielded by cover plate 63 mounted on side wall 33. A handle 80 may be mounted on cover 35.

It will be readily seen that whenever the interior of housing 30 has been brought to desired temperature and kept at that temperature by the operation of valve 62, residual meat which may remain in chopper head 13 will be refrigerated, and thus will not discolor or deteriorate. The device will, nevertheless, be readily available for use for the further processing of food, easy access being had to processing head 13 by way of cover 13 and door 37. An added advantage is the accessibility of the drive means 11, mounted outside the refrigerated housing 30, for operation, adjustment and repair.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent structures and devices.

Having thus described my invention, what I claim as new and desire to secure by Letters Patent is:

A portable heat insulated refrigerator housing for use with a self-supporting meat grinder having a supply tray, a processing head, and a separate drive means which comprises: a heat insulated supporting base; heat insulated side walls; an open front end; a heat insulated door disposed in and closing said open front end and hinged to one of said side walls; a heat insulated rear wall; said rear wall having a port therein; a heat insulated cover; and refrigerator coils disposed internally in said housing along a side wall thereof and having refrigerant conduit means for operative connection to a remote refrigerant system; said housing completely encasing the supply tray and processing head of said meat grinder separate from the drive means of said meat grinder with a portion of said processing head extending through said port to said drive means, while providing ready access to said processing head and supply tray by way of said door and cover.

References Cited in the file of this patent

UNITED STATES PATENTS

| | | |
|---|---|---|
| 2,060,605 | Biancalana | Nov. 10, 1936 |
| 2,109,560 | Willison et al. | Mar. 1, 1938 |
| 2,526,498 | Pacciano | Oct. 17, 1950 |
| 2,681,676 | Stiner | June 22, 1954 |